United States Patent
Cotterill et al.

(10) Patent No.: US 6,301,950 B1
(45) Date of Patent: Oct. 16, 2001

(54) MEASUREMENT OF SURFACE WEAR

(75) Inventors: Ronald I Cotterill; Kenneth Dunning, both of Chapel-en-le-Frith (GB)

(73) Assignee: Federal-Mogul Friction Products Limited, Manchester (GB)

(*) Notice: Subject to any disclaimer, the term of this patent is extended or adjusted under 35 U.S.C. 154(b) by 0 days.

(21) Appl. No.: 09/508,309

(22) PCT Filed: Sep. 11, 1998

(86) PCT No.: PCT/GB98/02757
  § 371 Date: May 5, 2000
  § 102(e) Date: May 5, 2000

(87) PCT Pub. No.: WO99/17072
  PCT Pub. Date: Apr. 8, 1999

(30) Foreign Application Priority Data

Sep. 27, 1997 (GB) .................................................. 9720513

(51) Int. Cl.$^7$ .................................................. G01N 19/02

(52) U.S. Cl. .................................................. 73/7

(58) Field of Search .................................... 73/7; 33/556

(56) References Cited

U.S. PATENT DOCUMENTS 4,856,199 * 8/1989 Merrill et al. .................... 33/203.17

* cited by examiner

Primary Examiner—Hezron Williams
Assistant Examiner—Katina Wilson
(74) Attorney, Agent, or Firm—Thomas S. Barker, Jr.

(57) ABSTRACT

A wear determining arrangement (30, FIG. 2(a)) for determining wear of a rubbing member of a friction couple, such as an iron brake disc, which is subject to slow wear by frictional engagement by brake pads, comprises a carrier (31) dimensional to overlie the rubbing surface of the disc and be releasably attached thereto by electromagnet (51). The carrier supports a transducer (33), such as magnetic displacement sensor having probe (43), that is mounted on a carriage (36) for scanning the probe across the surface. After an initial scan to map the surface the carrier is removed and re-attached after a period of brake usage, whereupon the surface is scanned again and wear assessed. The rate of wear is normally small, and to ensure that the amount which occurs in a reasonable period can be measured, the carrier is provided with datum projections (46 and 47) and the electromagnet is mounted by way of resilient coupling means (52) to bias the carrier into a stable "tripod" relationship on the surface. Alignment of scan signals at the different times may be by correlation between the signals and/or by an alignment template (71, FIG. 3(a)) which defines a track to be scanned and assists in re-positioning the carrier member with respect to the track subsequently.

19 Claims, 6 Drawing Sheets

Figure 1A:
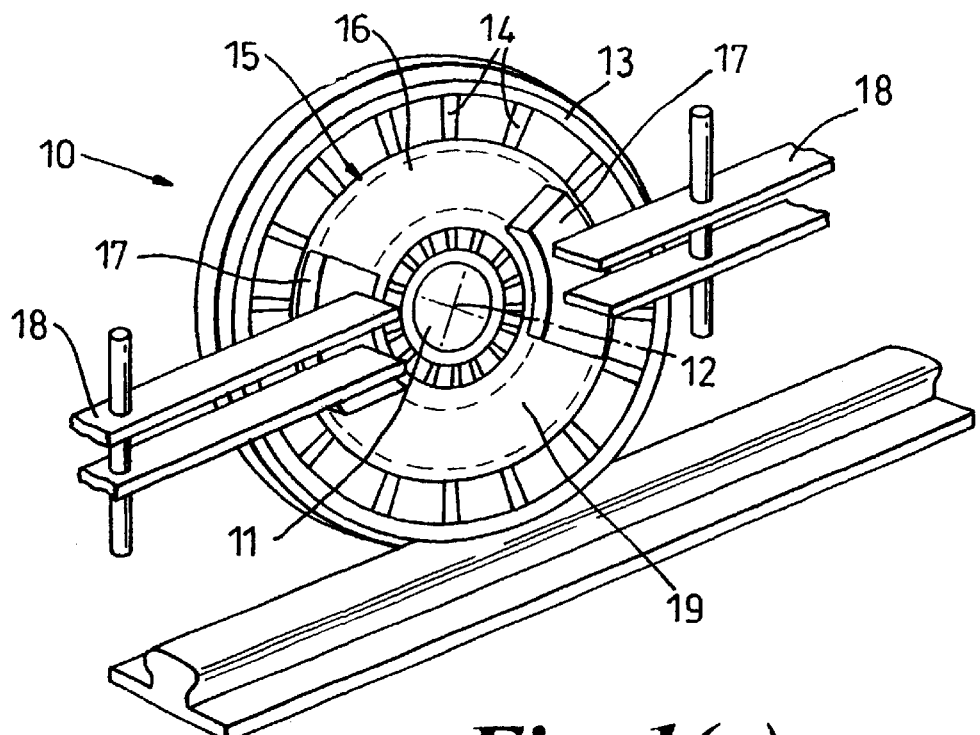

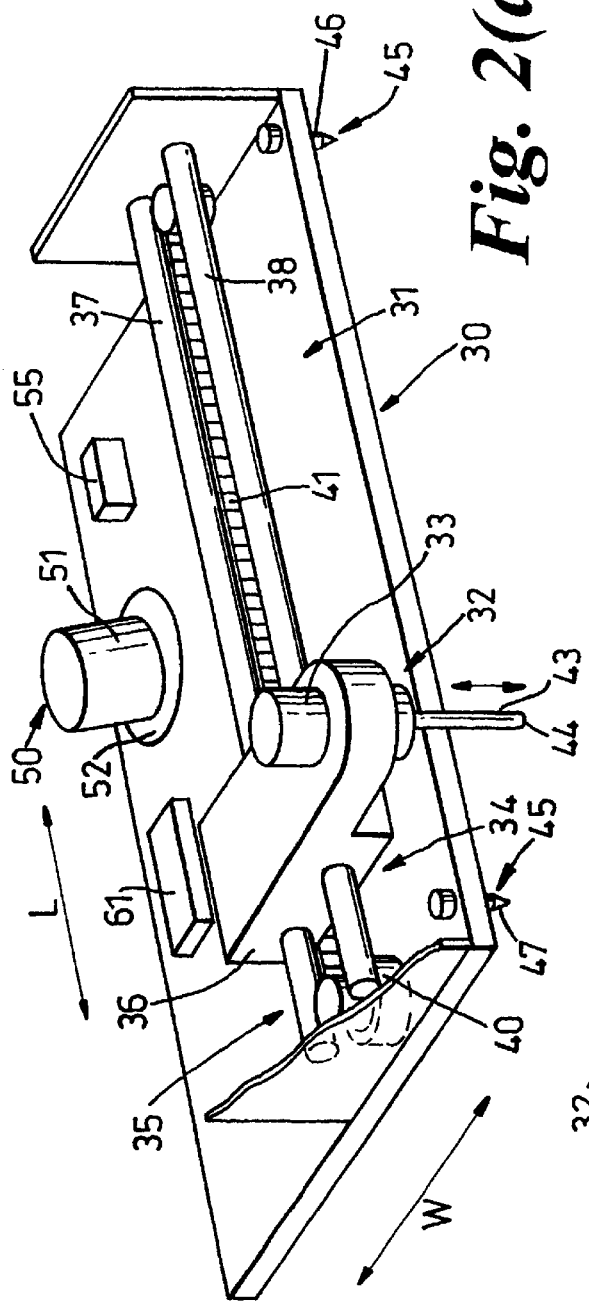
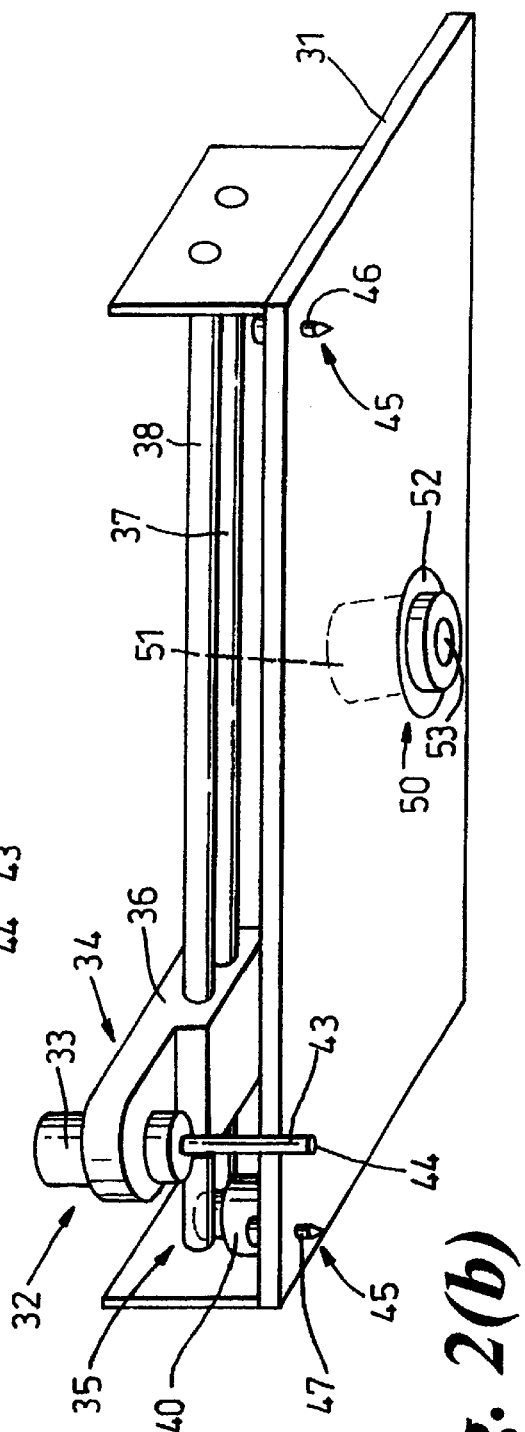

MEASUREMENT OF SURFACE WEAR

This invention relates to the determination of wear of a surface of a body and in particular relates to wear of a rubbing or frictional engagement surface of a friction couple such as a brake or clutch for a vehicle or like machine.

A friction couple is defined, for the purpose of this specification, as comprising a rubbing member having a rubbing surface and a friction material member capable of coupled motion relative to the rubbing surface when pressed into frictional engagement therewith substantially normally to the direction of said coupled motion such that a frictional engagement region extends along, and transversely to, said coupled direction.

The invention is particularly, but not exclusively, concerned with friction couples that comprise brake arrangements for railway or other such large vehicles. It is furthermore particularly concerned with disc brakes wherein the rubbing member is a disc of ferromagnetic material, iron or steel, and the rubbing surface is an annular region extending circumferentially around the axle or the disc supporting member and radially between inner and outer boundaries of the disc.

Within such exemplary railway disc brakes the swept areas are large and the co-operating friction material members are hard and contain materials which are designed to give low rates of the wear to the rubbing surface, that is, wear or abrasion of the surface is intended to take place over a long interval. If the braking system is not operating as intended there may be uneven and/or accelerated wear of the rubbing surface. However, because of the comparatively low rate of wear, even when anomalous, it is often difficult to measure before it has reached such a stage where the remaining life of the rubbing member, and possibly braking system per se is compromised.

In practice, safe operation of vehicles in use can be ensured by regular inspection and maintenance scheduled at suitably frequent intervals, although the cost of each and/or over-frequent inspections may be unsound economically.

It will be appreciated that when a new or changed design of friction couple is sought, such long intervals required before the rate of wear of rubbing surface that results from inappropriate rubbing member material or co-operating friction material make it difficult to experiment with, and compare, various combinations, and in the past it has frequently been necessary to commit to a brake design for a whole fleet of vehicles before its very long term characteristics are known, or perform prolonged braking tests (equivalent to months or years in service) to achieve wear rates that are measurable within the accuracy of known apparatus and methods.

In particular it is required to determine wear that occurs at different points across the frictional engagement region, in effect to map the wear, and to provide such indication of wear it is necessary to perform surface measurements at different times, separated by periods of wear or simulated braking operation. In that respect, it is not normally possible to have measuring apparatus permanently in place, and it becomes necessary therefore to be able to make comparable mapping measurements by way of apparatus that is separably positioned with respect to the rubbing surface on each occasion, which further challenges the accuracy achievable with existing apparatus and thus contributes to the length of time that is required between measurement operations to permit surface wear to accumulate sufficiently to be measured.

Such rubbing members and potential friction materials are, of course, tested upon dynamometer type machines which subject the friction couple to a carefully monitored programme of operating conditions which simulate those likely to be encountered in use and on an accelerated scale, but it is found that the kind of wear is usually so low as to be beyond the measuring capabilities/resolution of currently available measuring instruments, bearing in mind that a rubbing member may have a diameter of about 0.75 meters and is frictional engagement region of the rubbing surface of about 200 mm between radially inner and outer boundaries, whilst the average total wear may be of the order of less than 0.1 mm after many months in use, and variations in wear considerably less.

One measuring instrument employed hitherto to determine how wear occurs across the engagement region of a substantially plane rubbing surface of a ferromagnetic brake disc, that is, to map the wear of the rubbing surface across the engagement region, takes the form of a microscope, possibly incorporating a television camera, which is held against the rubbing surface by a permanent magnet ring that permits it to be clamped to the surface whilst the surface is in the vertical orientation normally found in use (or simulation) in relation to a vehicle wheel and then moved to different positions on the surface. In combination with the microscope a plurality of shallow blind holes, each having a prescribed degree of taper, are drilled in the rubbing surface at locations across the frictional engagement region such that by placing the microscope above each hole in turn an operative is able to assess from the current diameter of the hole the remaining depth and thus the amount by which the rubbing surface has become worn in the vicinity of the hole. This method is considered less than satisfactory in many respects. Apart from the obviously slow nature of the measurement that depends directly of the number of holes and the need to rely upon interpretation by a skilled operative, there are also drawbacks due to the inherent limitation in how closely together such holes/measurements can be made and accuracy achievable due to there being a tendency for the rubbing surface to 'flow' at the edge of any hole and mask the true diameter and wear it implies.

A different measuring instrument for determining a measure of surface roughness by scanning a probe across it automatically is described in DE-A-3901352. The arrangement relies upon being placed on a horizontally disposed surface. EP-A2-0509809 describes a method of determining the surface roughness of a mill roll by changes in reflection of a scanned beam of optical radiation.

However, as indicated above, it is frequently desirable for such measurements in respect of friction couples of vehicles to be made with the rubbing member in a disposition corresponding to that encountered in operation, that is vertically orientated and with proximate bodies which permit only limited access to the rubbing surface, more particularly the frictional engagement region thereof.

It will be appreciated that not all such friction couples include disc brakes, or indeed brakes at all, for example drum brakes and dry-plate clutches, and preserving the generality of the foregoing in relation to all such friction couples, it is an object of the present invention to provide, for a friction couple including a rubbing surface having a frictional engagement region, a wear determining arrangement which mitigates the accuracy problems of known devices and permits accurate and more comprehensive determination of wear in less time and with less dependency upon operative skill.

According to the present invention, for a friction couple comprising a rubbing member having a rubbing surface and a friction material member capable of coupled motion relative to the rubbing surface when pressed into frictional engagement therewith substantially normally to the direction of said coupled motion such that the frictional engagement region extends along and transversely to said coupled direction, an arrangement for determining wear of the rubbing surface comprises a (i) carrier member arranged to overlie a part of the frictional engagement region of the rubbing surface and including contact datum means adapted to bear on the rubbing surface, ii) transducer means including transducer support means, arranged to support, with respect to the carrier member, a transducer operable to provide signals related to the instantaneous distance of the frictional engagement region of the rubbing surface from the transducer support means and scanning means operable to effect production of said transducer signals with respect to a plurality of different positions across the frictional engagement region in a direction inclined with respect to said coupled direction, (iii) location means including (a) releasable attachment means adapted to engage releasably with the rubbing member and support the carrier member overlying said rubbing surface of said rubbing member, (b) flexible coupling means connected to the attachment means and the carrier member operable with the attachment means engaged with said rubbing member to dispose the carrier member with respect to said rubbing surface with the contact datum means in contact with the rubbing surface, and (c) alignment means operable to define a predetermined track across the frictional engagement region of the rubbing surface to be scanned by the transducer means and facilitate for each separate engagement of the attachment means to the rubbing member production of transducer signals representative of different positions along said track, and (iv) signal processing means operable to produce from said transducer signals an indication of the variation of distance of the rubbing surface from the transducer support means along said predetermined track and, for separate attachments of said attachment means to the rubbing member, variation of wear to the rubbing surface along said predetermined track in the time interval between said attachments.

Figure 1B:
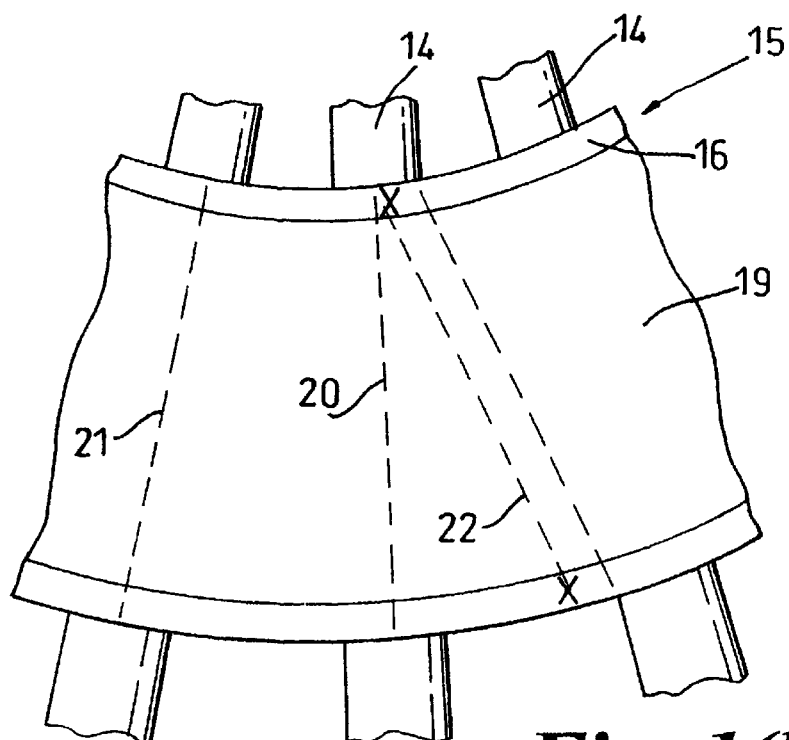
Figures 2C, 2D:
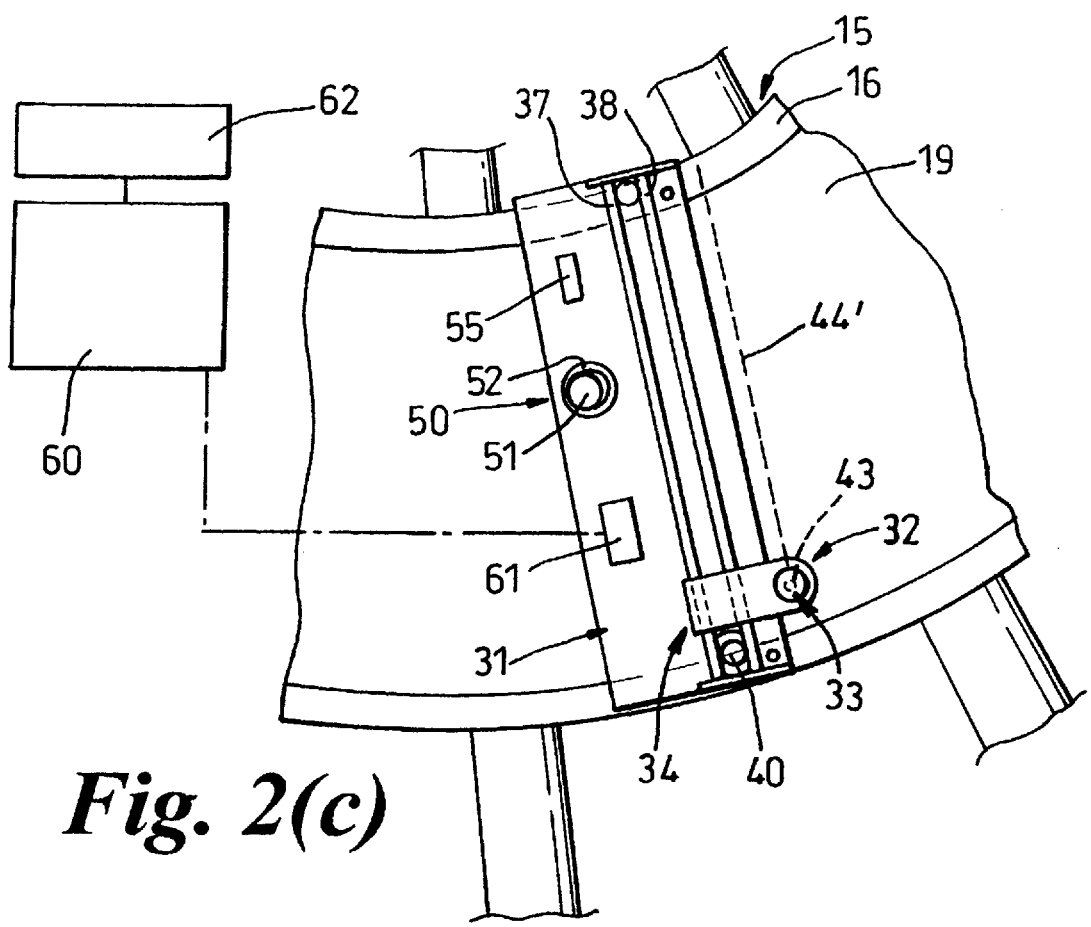
Figure 3A:
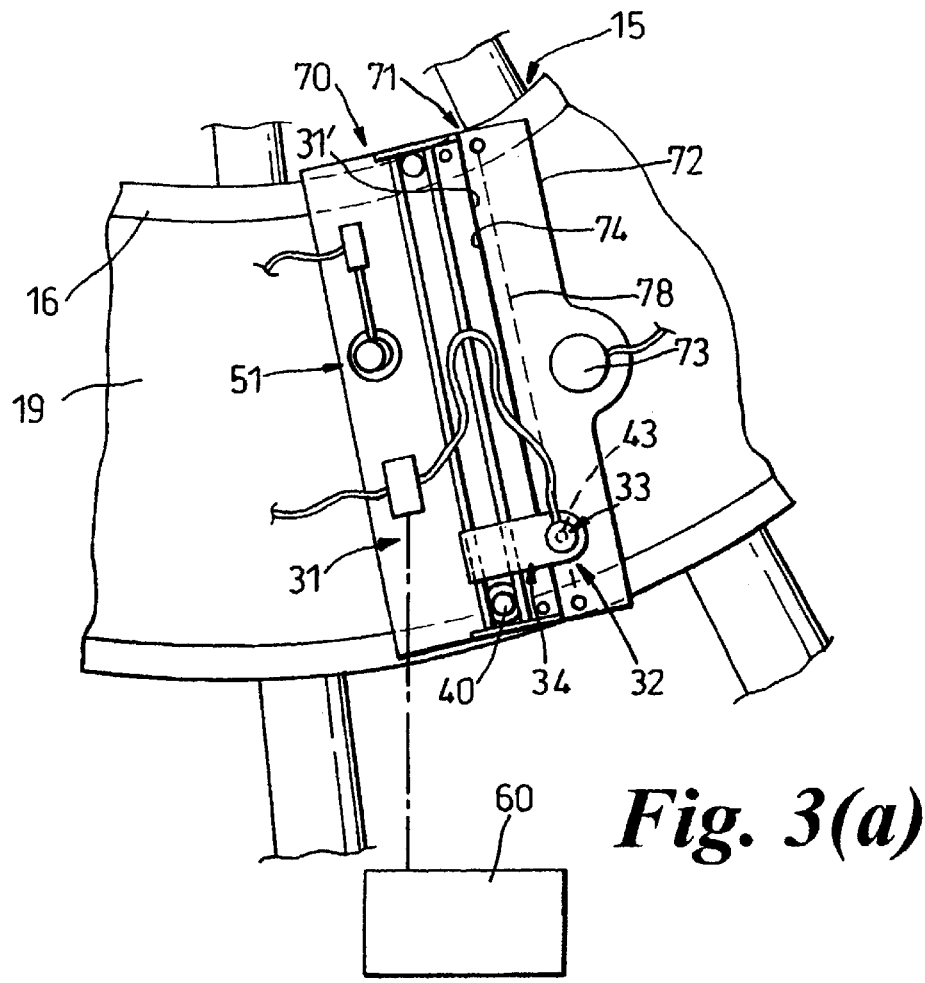
Figure 3B:
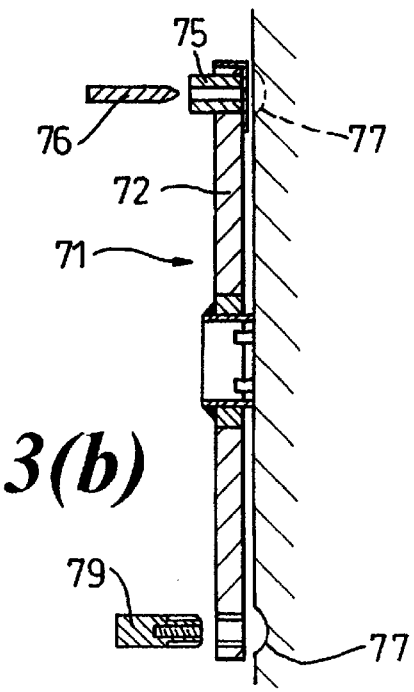
Figure 4A:
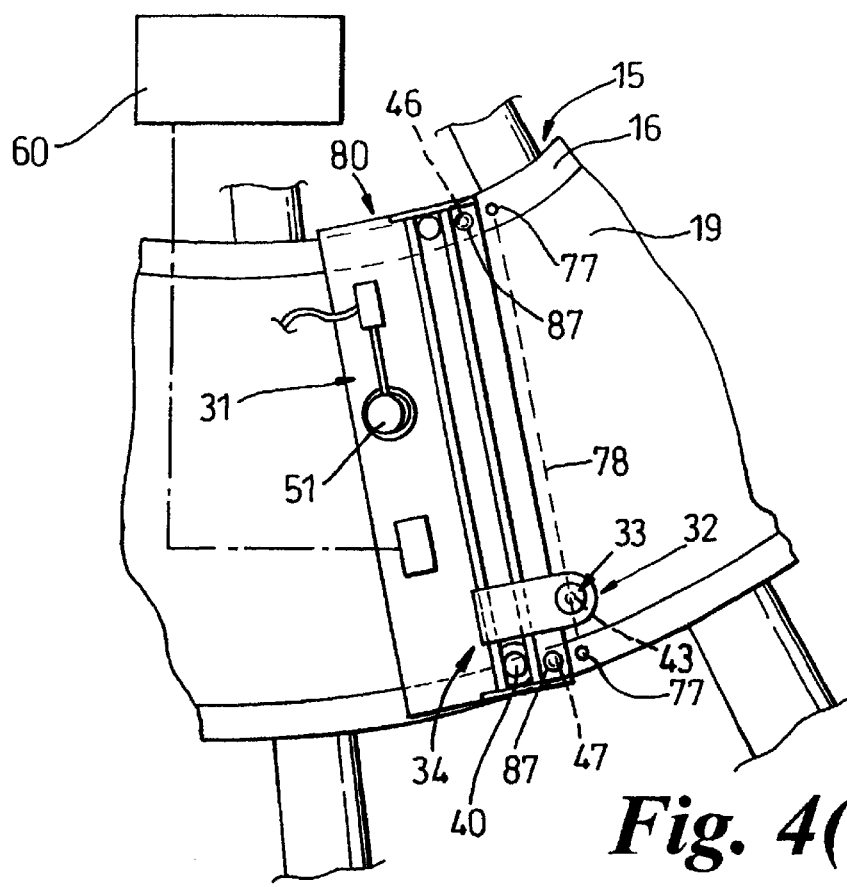
Figure 4B:
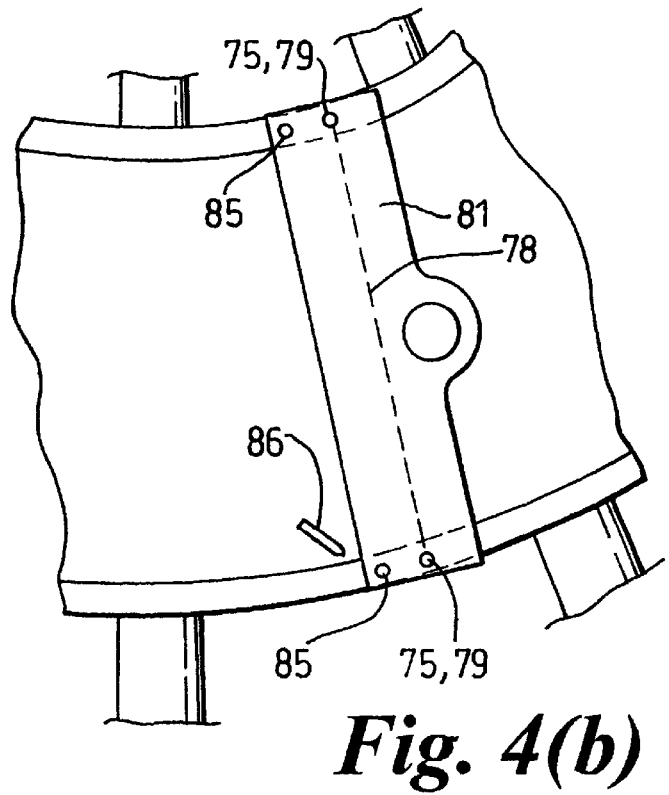
Figure 5A:
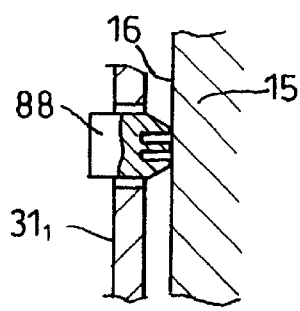
Figure 5B:
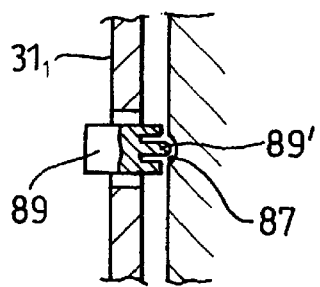
Figure 7A:
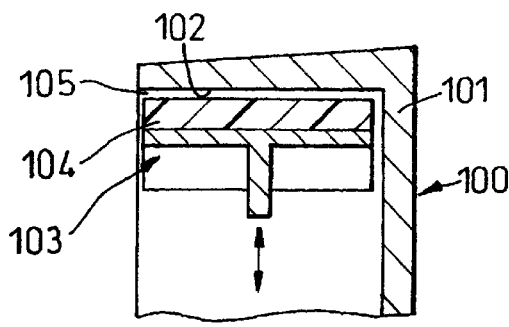
Figure 7B:
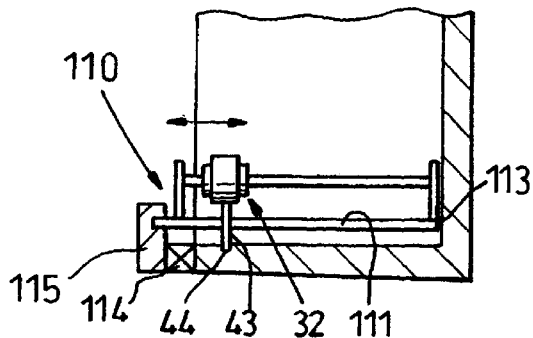
Figure 6:
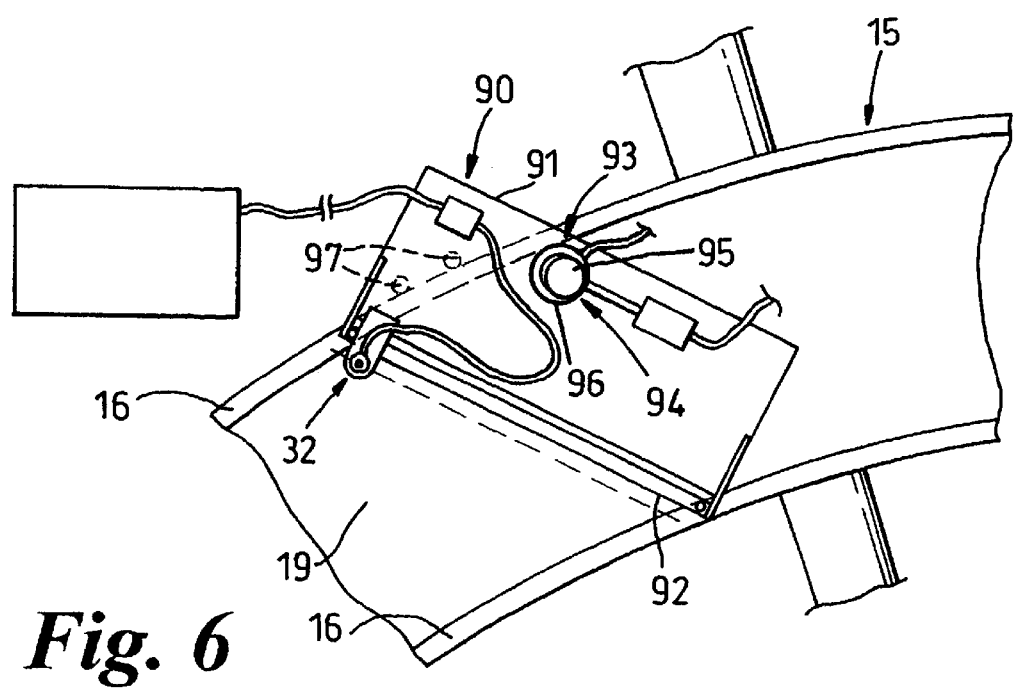

Embodiments of the invention will now be described by way of example with reference to the accompanying drawings, in which:

FIG. 1(a) is a perspective view of a wheel of a rail vehicle showing in part a disc brake arrangement therefor comprising a ventilated disc and pads of friction material arranged to be pressed against a rubbing surface of the disc by pivoted levers, the disc rotating relative to the pads in a coupled direction and where they contact sweeping out a frictional engagement region of the rubbing surface of the disc, FIG. 1(b) is a front view of part of the wheel of FIG. 1(a) showing the rubbing surface and extent of frictional engagement region to illustrate scanning across the region in order to determine wear to it resulting from the frictional engagement of braking, FIGS. 2(a) and 2(b) are schematic perspective views of a first form of apparatus in accordance with the present invention for determining wear of such a rubbing surface, FIG. 2(c) is a plan view of the apparatus of FIG. 2(a) when disposed operationally attached to a rubbing member defined by the brake disc of FIG. 1(a), FIG. 2(d) is a representation of a graphical output from signal processing means of the arrangement illustrating the manifestation of surface wear as a function of scanned transducer position, FIG. 3(a) is a plan view of a second form of apparatus in accordance with the present invention attached to a rubbing member in the manner of FIG. 2(c) but illustrating locating means in the form of an alignment template secured temporarily to the rubbing surface, FIG. 3(b) is a sectional elevation through the alignment template of FIG. 3(a) illustrating its usage, FIGS. 4(a) and 4(b) are plan views of component parts of a third form of apparatus in accordance with the present invention, illustrating a modified form of alignment template and carrier member, FIGS. 5(a) and 5(b) are sectional elevations of a part of the carrier having different forms of contact datum means, suitable for the carrier members of FIGS. 1(b) and 4(b) respectively, in which the contact datum means is electromagnetic, FIG. 6 is a schematic perspective view of a fourth form of apparatus in accordance with the invention disposed attached to the rubbing surface of a brake disc of a wheel at an upper region thereof and wherein the contact datum means is defined by a edge of the carrier member that is biased towards the rubbing surface by the weight of the apparatus suspended from by way of resilient coupling means from an attachment point above the contact datum means, FIG. 7(a) is a sectional elevation through a drum brake which comprises an alternative friction couple, wherein a part cylindrical friction member presses radially on a cylindrical rubbing surface of the rubbing member to effect braking, and FIG. 7(b) is a section elevation through such a drum-type rubbing member and a fifth form of apparatus in accordance with the present invention operationally disposed with respect to the cylindrical rubbing surface.

Referring to FIGS. 1(a) and 1(b) a wheel 10 for a rail vehicle comprises an axle 11 that defines a rotation axis 12 and a rim 13 spaced therefrom by radially extending spokes 14. The spokes are faced, on at least one axial facing side thereof, by a flat annular brake disc 15 of cast iron or steel having surface 16 against which brake pads 17 of friction material can be pressed by respective pivoted levers 18 to effect braking in conventional manner. The brake disc and pads comprise a friction couple 17' of which the disc 15 is a rubbing member, having rubbing surface 16, and each pad 17 comprises a friction material capable of coupled motion relative to the rubbing surface, by virtue of rotational motion of the latter, when pressed into frictional engagement substantially normally to the direction of coupled motion and defines a frictional engagement region 19 of the rubbing surface which extends along, and transversely to, the coupled direction, that is, the swept area of the brake disc.

It will be appreciated that in operation and as a result of successive braking operations on the vehicle, the components of the friction couple will wear. The rubbing surface of the disc, within the frictional engagement region 19 will normally wear to a much lesser extent than the friction interval of the pads and any wear that does occur will normally be uniform in the direction of the coupled motion, that is, in the circumferential direction of coupled motion along the frictional engagement region, but may vary across the regions in a direction inclined to the coupled motion direction due to variations in the properties of, and/or braking forces exerted on, the pads of friction material.

From FIG. 1(b) it will be seen that insofar as wear is substantially uniform in the direction of coupled motion, that is circumferentially, then wear across the frictional engagement region 19 may be measured at any inclination thereto and not just transversely thereto (radially). It will be appreciated that if the surface wear is mapped in a truly radial direction then it will be of little consequence if successive measurements are made at different circumferential positions, for example radial paths 20 and 21, whereas if an initial mapping measurement is made along a chord 22 defined between arbitrary points x-x then subsequent measurements will need to be made along the same chord or sufficiently closely thereto to be correlated with the first measurement.

It will be seen from FIG. 1(a) that in a typical situation in which rubbing surface wear is to be measured, the rubbing surface is not only vertically orientated but also there is limited access.

Referring now to FIGS. 2(a) to 2(d) a wear determining arrangement is shown generally at 30. It comprises a carrier member 31 in the form of a planer plate dimensioned with length L that overlies the rubbing surface between its radially inner and outer edges and width W that extends only a short distance orthogonally to its length such that it can overlie a part of the frictional engagement region of the disc and define a support face 31' for the functional parts thereof.

Transducer means, indicated at 32, includes transducer means 33, transducer support means 34 arranged to support the transducer with respect to the carrier member and scanning means 35. The support means 34 comprises carriage 36 mounted on a pair of parallel rails 37, 38 extending between opposite ends of the carrier member. The scanning means comprises a stepping motor 40 and a looped drive belt 41 to translate and reciprocate the carriage along the rails in accordance with supplied voltage pulses, that is, scan it with respect to the carrier member. The supplied pulses thus not only define and move the carriage to any instantaneous position but are also representative of that instantaneous position within the scan.

The transducer means 33 is mounted on the carriage for scanning reciprocation therewith and comprises an inductive displacement sensor which includes a probe 43 that has one degree of freedom, being displaceable in the direction of its length orthogonally to the direction of motion of the carriage, and which extends a short distance beyond the plate of the carrier member to a tip 44, such as a LVDT transducer type DG2.5 produced by Solarton Limited, England and available as Radiospares (RS) stock no 646-482.

The carrier member 31 also has contact datum means, indicated generally at 45, comprising a pair of projections 46, 47 each terminating in a raduissed point, and separated by such a distance as to bear on the rubbing surface 16 at opposite sides of the frictional engagement region 19 when the carrier member is placed overlying it.

The arrangement 30 also comprises location means, indicated generally at 50, for positioning the carrier member with respect to the rubbing surface with the transducer probe in contact with, and able to scan across, at least the frictional engagement region.

The location means comprises releasable attachment means in the form of an electromagnet 51 mounted with respect to the carrier member by way of flexible and resilient coupling means, such as a collar 52 of rubber or plastics material, the electromagnet having pole pieces 53 which are adapted to bear against the rubbing surface and adhere thereto, supporting the carrier member and transducer means, when suitable current is passed therethrough. Switching means 55 is provided to control the current flow to permit attachment and detachment of the carrier member with respect to the rubbing surface. The electromagnet is furthermore mounted such that the pole pieces are inclined with respect to the plane of the carrier member plate, whereby as the magnetic flux of the electromagnet which passes through the rubbing member and draws the poles pieces into alignment with the surface the coupling means 52 applies a bias force to the plate such that the projections 46, 47 of the carrier member are pressed securely into contact with the rubbing surface, and the carrier member is securely attached to the surface effectively by a stable tripod mount.

The arrangement 30 also includes signal processing means, indicated generally at 60 conveniently found by a general purpose computer programmed to supply the stepping motor 40 to effect scanning of the carriage across the rubbing surface and effect interpretation of the signals produced by the transducer. The signal processing means may, in the main part, be separate from the carrier member, but conveniently the latter carries analogue-to-digital conversion (ADC) means 61 to convert the analogue signals of the transducer to digital form and suitable for transfer for remote processing. The signal processing means also includes indication means 62, such as a plotter for providing output related to scanning the rubbing surface in graphical form and/or means for giving a numerical output.

Thus in operation, the carrier member is disposed overlying the rubbing surface and attached thereto as shown in FIG. 2(c) such that the transducer probe is in contact with the rubbing surface 16 and can be scanned across it for a slightly greater distance than the frictional engagement region 19, the probe tip 44 following a track (indicated generally at 44') that is defined by the position of the carrier member on which it is supported.

The signal processing means controls the scanning motion such that it steps the probe to a series of positions in succession and receives from the transducer a corresponding succession of signals indicative of the instantaneous distance of the surface from the supported transducer body. Preferably the scanning means is arranged to cause probe to cross the surface along said track a plurality of times. The signal processing means is then able to produce a graphical and numerical output mapping the instantaneous distance from transducer body to surface, that is, relating to the profile of the surface along the line of the scan track before wear (or further wear) of the rubbing surface occurs. Such graphical output is typically as represented in FIG. 2(d), which represents by its vertical axis the distance from transducer body to rubbing surface and by its horizontal axis the transducer position along the scanned track, by the upper trace line 63.

The carrier member is removed and the brake arrangement subjected to wear conditions. After an interval the carrier member is attached in approximately the same orientation with respect to the rubbing surface and further measurements made as the transducer is scanned across the surface.

The transducer signals obtained as a result of such reattachment and scanning of the transducer are fed to the signal processing means and correlated with those of the initial scan to remove the effects of slight differences in position and scan direction by conventional correlation algorithms implemented in software or hardware forms. The corrected signals, which again represent a series of instantaneous distances between rubbing surface and transducer body, produce a numerical and/or graphical output, illustrated superimposed on the plot of FIG. 2(d) as the lower (full) trace line 64. The changes in distance (vertical axis) represent wear of the surface and the extent or such wear may be interpreted at individual points or by the volume of rubbing member material removed, that is, the area between the plots.

The carrier member is thereafter detached from the rubbing surface and may, if desired, be reattached for a third and subsequent times after further periods of wear to derive further plots, such as that represented by broken trace line 65.

It has been found that by virtue of the tripod mount and particularly the ability for the attachment means to bias the spaced contact datum projections against the rubbing surface and adapt to local variations in the rubbing member, the degree of resolution achievable and the repeatability of measurement is unusually high for apparatus in this field of the art. It has been found that the above identified analogue transducer can regularly produce accuracy of distance measurement within an ADC resolution of 0.001 mm.

The above described embodiment relies upon being able to achieve effective alignment of the scans from different attachments of the carrier member by signal processing as a result of similarities between the signals that are characteristically a function of the scan. To that end the means for providing signal correlation comprises alignment means of the location means, and may be performed separately from, or by, the signal processing means 60.

Referring now to FIGS. 3(*a*) and 3(*b*), in a second embodiment of wear determining arranged indicated at 70 the carrier member 31, transducer means 32, attachment means 51 and signal processing means 60 correspond to those described above and are given the same reference numbers without description number. It differs in respect of the alignment means of the location means.

The alignment means, indicated generally at 71, comprises an alignment template 72 in the form of a flat plate of metal or other material dimensioned to overlie the rubbing surface and including means, such as template electromagnet 73, to secure it releasably to the rubbing surface. One edge 74 of the plate is shaped to conform with correspondingly shaped edge 31' of the carrier member 31 such that the latter can be brought into abutment with, and be aligned with respect to the rubbing surface by, the secured template prior to attachment of the carrier member to the rubbing surface by attachment electromagnet 51 and subsequent to which attachment the template can be removed.

Such a simple template provides the ability to define an initial and re-attachment orientation for the carrier member by way of a smaller, more easily disposed member where access is restricted, but in such form still relies upon the ability to correlate the transducer signals for each attachment. However the template may also provide the ability to define a track for the transducer scan with which it can be aligned for the successive attachments of the carrier member with such accuracy as to permit inherently substantially correlated transducer signals.

To this end, the alignment template 72 initially includes a pair of guides 75 (only one of which is shown) spaced apart at such a distance that with the template secured to the rubbing surface they overlie the rubbing surface 16 at opposite sides of the frictional engagement region 19. Track defining means, in the form of a round-nosed punch 76, is dimensioned to slide through the guides and upon impact to impress into the rubbing surface and define a correspondingly spaced apart pair of track recesses 77 which define a predetermined track 78 between them across the frictional engagement region (corresponding to the marks x and x of FIG. 1(*b*)). The guides are positioned with respect to the edge 74 of the template so that the track-defining line 78 between them is coincident with the scan line or track of the transducer probe when the edge 31' of the carrier member is in abutment with the template edge 74.

The template is arranged such that having made the track recesses the guides are fitted with, or replaced by, template alignment projections 79 which extend through the template and engage in the track recesses 77 to permit the template, which is removed for scanning, to be repositioned accurately with respect thereto on subsequent occasions, and thus permit the transducer probe to scan along the same track between the track recesses whenever the carrier member is positioned by way of alignment with the template.

Furthermore, the well-defined track recesses 77 also provide well defined features for the transducer to encounter, and provide distinctive signals indicative of the boundary of the scan beyond the edges of the frictional engagement region 19 but within the boundaries of the scanning member. The uniformity of such signals which makes them characteristic may provide control signals to limit translation of the carriage, to ensure the transducer pointer does not encounter an edge of the rubbing surface, and/or a means for determining, by direct comparison of signal levels, the degree of alignment of the carrier members with respect to the track 78 defined between the recesses on separate attachment occasions.

Referring to FIGS. 4(*a*) and 4(*b*), the components of a third embodiment of wear determining arrangement 80 are shown in plan view similar to FIGS. 4(*a*) and (*b*). The arrangement of this embodiment differs from the arrangement 70 in that the alignment template 81 includes, in place of the alignment edge 74, a pair of supplementary guides 85 also arranged to overlie the rubbing surface 16 at opposite sides of the frictional engagement region, being spaced apart from each other by a distance corresponding to the separation of the projections 46, 47 of the control datum means of the carrier member 31 and laterally from the track defining guides by the separation between datum projections and probe scan path of the carrier member. Alignment defining means, in the form of a round nosed punch 86, analogous to, and possibly the same as, track-defining punch 76, is dimensional to slide through the supplementary guides whilst the template is secured to the rubbing member to define a pair of alignment recesses 87 in said fixed relationship to the track recesses 77, being displaced therefrom and the track 78 they define in the same relationship that the contact datum projections 46, 47 of the carrier member have with respect to the line of the transducer probe scan. Thus, having made the track and alignment recesses by way of securing the alignment template 81 to the rubbing surface in a substantially arbitrary position, the template is removed and the carrier member located by way of engagement of the contact datum projections 46, 47 and the alignment recesses 87 before the attachment electromagnet 51 is energised to secure the carrier member in position with the transducer probe aligned with the track 78 defined between the track recesses. Thus, whenever the carrier member is removed and subsequently re-attached, there is substantial alignment of the transducer with the track across the rubbing surface.

It will be appreciated that structural variations may be made to the above described embodiments as appropriate. For example, the attachment means may be other than an electromagnet, such as a clamp which engages the edge of the rubbing surface; this is particularly true if the rubbing member is not made of ferromagnetic material. Likewise the contact datum means may be other than simple projections and may actively assist in attaching the carrier member to the rubbing surface. Referring to FIG. 5(*a*), this shows in schematic sectional elevation a part of carrier member 31$_1$ having a contact datum projection in the form of an electromagnet 88 the pole or poles of which stand proud of the carrier member to effect the abutment with the rubbing surface 16. Referring to FIG. 5(b), such an electromagnet 89 is shown with poles formed at least in part with a rounded projection 89' shaped to engage with an above-described alignment recesses 87 in the rubbing surface prior to energisation of the electromagnet. In both cases these contact datum projection electromagnets effect or aid the bias of the coupling means and may also aid the attachment means in supporting the weight of the carrier member and transducer means. Such projecting electromagnets may be mounted rigidly with respect to the carrier member or by way of resilient mounting means.

In the above described embodiments and variants, the carrier member has been shown with location means suitable for locating it with respect to the lower part of a vertical rubbing member. Where space and access permits, they may be disposed in relation to any part of the rubbing member.

Referring to FIG. 6, this shows a fourth embodiment 90 of wear determining arrangement shown as disposed with respect to the upper part of such a vertical annular rubbing member 15. The arrangement has a carrier member 91 comprising a flat plate and supporting transducer means as described above. The contact datum means is defined by a datum edge 92 of the carrier member plate which lies across the rubbing surface. Location means, indicated generally at 93 comprises attachment means 94 in the form of electromagnet 95 disposed in relation to the carrier member by way of resilient coupling means 96 such that in operational position it is above the datum edge and the weight of the carrier member and transducer means serves to bias the datum edge into contact with the rubbing surface.

Where the edge of the rubbing member is accessible, the location means may include one or more locating pegs 97 extending from the carrier member towards the rubbing member to locate at the edge thereof and define an approximately repeatable orientation and position for the carrier member with respect to the rubbing member.

It will be appreciated that the same structural variations, such as datum edge and location pegs, may be employed with the previously described embodiments, and the control datum means of those embodiments may be employed with this one instead of the datum edge, as may its disposition in relation to a lower part of the rubbing member.

All of the above described embodiments have been directed to determining wear in the rubbing member of a friction couple that comprises a disc brake. Referring now to FIGS. 7(a) and 7(b) the former shows in schematic sectional elevation, part of a drum brake 100 in which the rubbing member 101 comprises a cast iron drum having an internally facing cylindrical rubbing surface 102 against which a part-cylindrical shoe 103, carrying a lining of friction material 104, is pressed to affect braking, the shoe defining a cylindrical, rather than annular, frictional engagement region 105.

Referring particularly to FIG. 7(b) a fifth embodiment of wear determining arrangement 110 in accordance with the present invention has a carrier member 111 supporting transducer means 32 as described above. The carrier member is dimensioned to fit the much shallower rubbing surface and has contact datum means 113 arranged to support the carrier with respect to the rubbing member 101 against the wall of the drum. Attachment means 114 in the form of an electromagnet (or other clamp) also is arranged to secure the carrier member with respect to the rubbing member externally of the drum, the attachment means being joined by resilient coupling means 115 to the carrier member such that the weight of the latter biases it into position with the contact datum means 113 against the rubbing member. Clearly, other forms of location and attached, such as the aligned template described above may be adapted for use with such cylindrical rubbing surface.

As mentioned above the friction couple may be other than a brake for a vehicle, or brake per se, such as a dry-plate clutch wherein the rubbing member and its surface comprise a driving or driven annular plate or drum of such clutch arrangement.

Furthermore the transducer means may take a variety of different forms that are capable of measuring distance to the rubbing surface; for instance instead of having a physical probe with a tip that contacts the surface, such transducer may have a virtual probe formed by a beam of ultrasonic or electromagnetic radiation.

Likewise the scanning means may be arranged to produce other than a rectilinear scan by translation of the transducer and its probe; scanning means may for example, sweep the transducer probe along an arcuate path or, if the transducer means has a virtual probe formed by a beam of radiation, the scanning means may be arranged with or without moving parts, as appropriate, to scan the beam without translating the whole transducer.

Whereas some of the above embodiments and variants thereof have been described with respect to a rubbing surface which is orientated in a vertical or near vertical plane, it may, of course be employed with such surfaces disposed in different orientations, for example if a wheel is removed from a vehicle.

What is claimed is:

1. For a friction couple comprising a rubbing member having a rubbing surface and a friction material member capable of coupled motion relative to the rubbing surface when pressed into frictional engagement therewith substantially normally to the direction of said coupled motion such that the frictional engagement region extends along and transversely to said coupled motion direction, an arrangement for determining wear of the rubbing surface comprising (i) carrier member arranged to overlie a part of the frictional engagement region of the rubbing surface and including contact datum means adapted to bear on the rubbing surface, (ii) transducer means including transducer support means, arranged to support, with respect to the carrier member, a transducer operable to provide signals related to the instantaneous distance of the frictional engagement region of the rubbing surface from the transducer support means and scanning means operable to effect production of said transducer signals with respect to a plurality of different positions across the frictional engagement region in a direction inclined with respect to said coupled motion direction; and characterised by (iii) location means including (a) releasable attachment means adapted to engage releasably with the rubbing member and support the carrier member overlying said rubbing surface of said rubbing member, (b) flexible coupling means connected to the attachment means and the carrier member operable with the attachment means engaged with said rubbing member to dispose the carrier member with respect to said rubbing surface with the contact datum means in contact with the rubbing surface, and (c) alignment means operable to define a predetermined track across the frictional engagement region of the rubbing surface to be scanned by the transducer means and facilitate for each separate engagement of the attachment means to the rubbing member production of transducer signals representative of different positions along said track, and (iv) signal processing means operable to produce from said transducer signals an indication of the variation of distance of the rubbing surface from the transducer support means along said predetermined track and, for separate attachments of said attachment means to the rubbing member, variation of wear to the rubbing surface along said predetermined track in the time interval between said attachments.

2. A wear determining arrangement as claimed in claim 1 wherein the flexible coupling means comprises resilient coupling means arranged with respect to the attachment means and carrier member to operate, with the attachment means in engagement with the rubbing member, to bias the contact datum means into contact with the rubbing surface.

3. A wear determining arrangement as claimed in claim 1 wherein the carrier member comprises a plate having a support face dimensioned to overlie the frictional engagement region and the contact datum means comprises a datum edge of said plate.

4. A wear determining arrangement as claimed in claim 1 wherein the contact datum means comprises a pair of projections of the carrier member spaced apart along the carrier member and separated by such a distance as to bear against the rubbing surface at opposite sides of said frictional engagement region.

5. A wear determining arrangement as claimed in claim 1 wherein the transducer support means comprises a carriage supported on the carrier member for translation relative thereto and the scanning means comprises means to translate and reciprocate the carriage with respect to the carrier member and the frictional engagement region of the rubbing surface.

6. A wear determining arrangement as claimed in claim 1 wherein the transducer means comprise a probe arrangement having a body secured to the carriage and a probe tip arranged to extend from the body to the rubbing surface of the rubbing member, said probe arrangement being operable to provide signals representative of the distance of the probe tip from the body.

7. A wear determining arrangement as claimed in claim 1 wherein the alignment means comprises signal correlation means operable to correlate the transducer signals that represent successive scan across the rubbing surface to align them with respect to each other and said predetermined track.

8. A wear determining arrangement as claimed in claim 1 arranged to function with a rubbing member of ferromagnetic material, wherein the attachment means comprises electromagnet means having pole pieces adapted to contact the rubbing member and support the arrangement therefrom by means of magnetic flux extending through the rubbing member, and switching means operable to disrupt said magnetic flux to permit removal of said arrangement.

9. A wear determining arrangement as claimed in claim 8 wherein said electromagnet means is arranged with said pole pieces adapted to contact the rubbing surface of the rubbing member, the contact datum means comprises a pair of projections of the carrier member spaced apart along the carrier member and separated by such a distance as to bear against the rubbing surface at opposite sides of said frictional engagement region and the attachment means pole piece and projections of the contact datum means are spaced apart from each other in a triangular relationship.

10. A wear determining arrangement as claimed in claim 1 wherein the alignment means includes locating features on the carrier member and/or rubbing member arranged to permit said carrier member to be disposed in predetermined alignment with respect to said predetermined track.

11. A wear determining arrangement as claimed in claim 10 wherein the alignment means includes one or more location pegs extending from the carrier member towards the rubbing member to locate at an edge of the rubbing member to define approximately the initial orientation and position of the carrier member and attachment means with respect to the rubbing member.

12. A wear determining arrangement as claimed in claim 1 wherein the alignment means comprises an alignment template, arranged to be releasably secured to the rubbing member overlying the rubbing surface and defining said predetermined track across the frictional engagement region of the rubbing surface, and means to effect alignment of the carrier member with respect to said rubbing surface to align the transducer probe with respect to the said track prior to engagement of the attachment means with the rubbing member.

13. A wear determining arrangement as claimed in claim 12 wherein the alignment template is arranged to be removable subsequent to engagement of the attachment means to the rubbing member to expose said predetermined track of the frictional engagement region to the transducer means.

14. A wear determining arrangement as claimed in claim 12 wherein the alignment template and carrier member have co-operating alignment features arranged to permit alignment of the carrier with respect to the template whilst the template is secured with respect to the rubbing member.

15. A wear determining arrangement as claimed in claim 12 wherein the contact datum means comprises a pair of projections of the carrier member spaced apart along the carrier member and separated by such a distance as to bear against the rubbing surface at opposite sides of said frictional engagement region and the alignment template includes a pair of supplementary guides also arranged to overlie the rubbing surface at opposite sides of the frictional engagement region and spaced apart by a distance corresponding to the separation of the projections of the contact datum means of the carrier member, and alignment defining means operable to impress into the rubbing surface by way of the supplementary guides, whilst the alignment template is secured to the rubbing member, a corresponding pair of alignment recesses permitting location of the carrier member upon attachment thereof to the rubbing member and in alignment with respect to the track recesses.

16. A wear determining arrangement as claimed in claim 12 wherein the alignment template is arranged to function with a rubbing member of ferromagnetic material, and includes a template electromagnet, arranged to secure the template to the rubbing member by way of magnetic flux extending through the rubbing member.

17. A wear determining arrangement as claimed in claim 12 wherein the alignment template includes a pair of guides spaced apart and arranged to overlie the rubbing surface at opposite sides of the frictional engagement region, track defining means operable to impress into the rubbing surface by way of the guides whilst the alignment template is secured to the rubbing member a correspondingly spaced apart pair of track recesses defining said predetermined track.

18. A wear determining arrangement as claimed in claim 17 wherein the alignment template includes template aligning means to align the template position with respect to the track recesses by way of the guides when being subsequently secured to the rubbing surface.

19. A wear determining arrangement as claimed in claim 18 wherein the template aligning means includes template alignment projections (79) arranged to occupy the guides after positioning of the track recesses.

* * * * *